United States Patent
Bravo Solis et al.

(10) Patent No.: US 9,694,744 B2
(45) Date of Patent: Jul. 4, 2017

(54) FLEXIBLE LIGHTING SYSTEM AND COMPONENT ILLUMINATED BY THE SYSTEM

(71) Applicant: CONTINENTAL AUTOMOTIVE SYSTEMS, INC., Auburn Hills, MI (US)

(72) Inventors: Maria Nohemi Bravo Solis, Jalisco (MX); Monica Abigail Aceves Mendoza, Jalisco (MX); Humberto Merchand Alvarado, Jalisco (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/501,376

(22) Filed: Sep. 30, 2014

(65) Prior Publication Data

US 2016/0090033 A1   Mar. 31, 2016

(51) Int. Cl.
*B60Q 3/00* (2006.01)
*B60Q 3/04* (2006.01)
*B60Q 3/64* (2017.01)
*B60Q 3/14* (2017.01)

(52) U.S. Cl.
CPC ............... *B60Q 3/044* (2013.01); *B60Q 3/14* (2017.02); *B60Q 3/64* (2017.02)

(58) Field of Classification Search
CPC ........ B60Q 3/0289; B60Q 3/04; B60Q 3/042; B60Q 3/044; B60Q 3/046; B60Q 3/14; B60Q 3/06; H05K 1/141; H05K 1/147; H05K 1/148; G01D 11/28
See application file for complete search history.

(56) References Cited

U.S. PATENT DOCUMENTS

| 689,937 | A | 12/1901 | Werner |
| 6,502,968 | B1* | 1/2003 | Simon ............... H05K 1/141 |
| | | | 362/249.04 |
| 7,536,906 | B2 | 5/2009 | Burke |
| 2004/0130912 | A1 | 7/2004 | Miyashita |
| 2007/0263385 | A1* | 11/2007 | Fan .................. F21S 4/007 |
| | | | 362/249.16 |

FOREIGN PATENT DOCUMENTS

| DE | 102010051306 A1 | 5/2012 |
| DE | 102013101599 A1 | 8/2013 |
| EP | 1870331 A1 | 12/2007 |
| WO | 2006/137623 A1 | 12/2006 |

* cited by examiner

*Primary Examiner* — Thomas M Sember

(57) ABSTRACT

A flexible lighting system includes a printed circuit board, a flexible multiple electrical conductor strip, a light source, and a flexible light conductor. The light source is mounted on the flexible multiple electrical conductor strip and is electrically connected to the printed circuit board by the flexible multiple electrical conductor strip. The flexible light conductor is mounted on the flexible multiple electrical conductor strip to conduct light from the light source. A component, such as, a gauge can have a display with a graphical element that is illuminated or backlit by the flexible light conductor.

3 Claims, 3 Drawing Sheets

US 9,694,744 B2

FLEXIBLE LIGHTING SYSTEM AND COMPONENT ILLUMINATED BY THE SYSTEM

BACKGROUND OF THE INVENTION

Field of the Invention

The invention relates to a flexible lighting system for illuminating one or more graphical elements of a component and to a component with one or more graphical elements being illuminated by the flexible lighting system.

Description of the Related Art

It is often desirable to illuminate one or more graphical elements formed in a component, such as, a gauge or a display screen of an instrument cluster in a vehicle dashboard. Typically, a rigid light conductor is used to direct light from a light source on a printed circuit board to a graphical element, for example, a telltale, to be illuminated. However, the geometries of new designs of such components are becoming increasingly complex. For example, new shapes and new shape combinations are being used. At the same time, the volumes of such components are becoming smaller. The complex geometry and smaller volume make it difficult to effectively route a rigid light conductor to the location needing illumination.

BRIEF SUMMARY OF THE INVENTION

It is an object of the invention to provide a lighting system that can provide illumination to a graphical element formed in a component even in the situation where the component has a complex geometry and/or a small volume.

With the foregoing and other objects in view there is provided, in accordance with the invention, a flexible lighting system that includes: a printed circuit board; a flexible multiple electrical conductor strip; a light source mounted on the flexible multiple electrical conductor strip and electrically connected to the printed circuit board by the flexible multiple electrical conductor strip; and a flexible light conductor mounted on the flexible multiple electrical conductor strip to conduct and emit light from the light source.

In accordance with an added feature of the invention, the flexible light conductor extends along a portion of the flexible multiple electrical conductor strip.

In accordance with an additional feature of the invention, the flexible multiple electrical conductor strip has an end; and the flexible light conductor extends to the end of the flexible multiple electrical conductor strip.

In accordance with another feature of the invention, the light source is a light emitting diode.

In accordance with a further feature of the invention, the flexible light conductor is made of silicon.

In accordance with another added feature of the invention, the flexible multiple electrical conductor strip is a flexible printed circuit board.

With the foregoing and other objects in view there is also provided, in accordance with the invention, a component, including a display with at least one graphical element formed therein; and a flexible lighting system including: a printed circuit board, a flexible multiple electrical conductor strip, a light source mounted on the flexible multiple electrical conductor strip and electrically connected to the printed circuit board by the flexible multiple electrical conductor strip, and a flexible light conductor mounted on the flexible multiple electrical conductor strip and extending to the graphical element formed in the display of the component for conducting light from the light source and emitting the light to the graphical element formed in the display of the component.

In accordance with an added feature of the invention, the component is a gauge and the display is a dial of the gauge.

In accordance with an additional feature of the invention the display is a display screen in a vehicle dashboard.

Other features which are considered as characteristic for the invention are set forth in the appended claims.

Although the invention is illustrated and described herein as embodied in a flexible lighting system and component illuminated by the system, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS OF THE INVENTION

Figure 1:
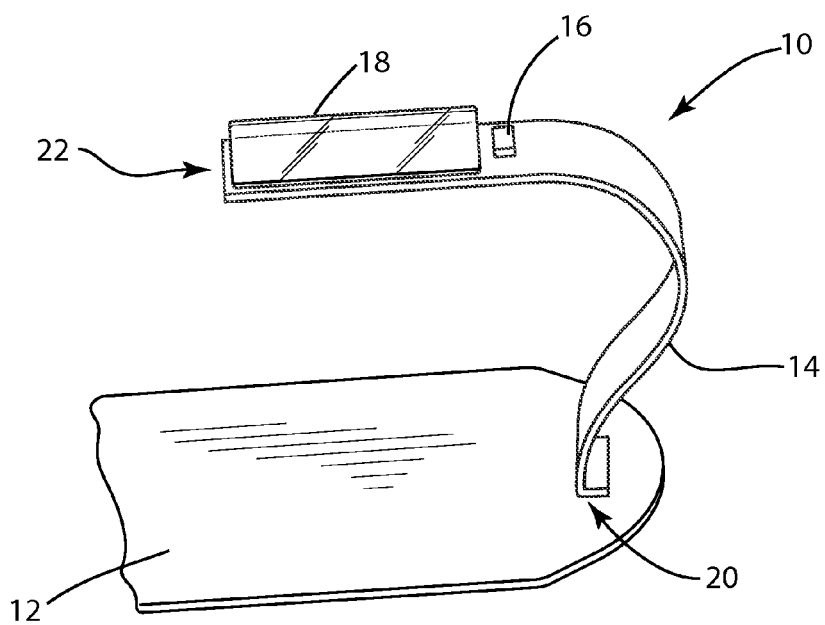
FIG. 1 is a view of an exemplary embodiment of a flexible lighting system.

Referring now to the figures of the drawing in detail and first, particularly to FIG. 1 thereof, there is shown an exemplary embodiment of a flexible lighting system 10 that includes at least a printed circuit board preferably embodied as a rigid printed circuit board 12, at least one flexible multiple electrical conductor strip preferably embodied as a flexible printed circuit board 14, a light source preferably embodied as a light emitting diode (LED) 16, and a flexible light conductor 18. Even though this description refers to the preferred embodiments of certain components, it should be understood that the invention is not limited to such preferred embodiments. For example, the flexible multiple electrical conductor strip need not be embodied as a flexible printed circuit board 14. The flexible multiple electrical conductor strip could alternatively be embodied in any other known way that provides enough flexibility to be routed to the location requiring illumination. Also, the light source need not be embodied as a light emitting diode 16. Many other known light sources could be alternatively used.

The exemplary embodiment of the flexible lighting system 10 will now be discussed in more detail. One end 20 of the flexible printed circuit board 14 is secured to the printed circuit board 12. The opposite end 22 of the flexible printed circuit board 14 will be routed to the location requiring illumination. The flexible printed circuit board 14 also includes two electrical conductors that electrically connect the light emitting diode 16 to electrical conductors on the printed circuit board 12. The electrical conductors on the printed circuit board 12 will be connected to an external power source, for example, a DC power source of a vehicle. In this way, the external power source provides the electrical energy that enables the light emitting diode 16 to emit light. The light emitting diode 16 is not mounted on the printed circuit board 12, but rather is mounted on the flexible printed circuit board 14 at a location that preferably is closer to the end 22 than to the end 20. This mounting location is preferably much closer to the end 22. The flexible light conductor 18 need only extend along the portion 24 of the flexible printed circuit board 14 that will be placed near the one or more graphical elements to be illuminated with backlighting. It can be seen that the flexible light conductor 18 extends only from the light emitting diode 16 to the end 22 of flexible printed circuit board 14. This results in better control of the light and easier development since a simple generic geometry can be used to illuminate an area. The flexible light conductor 18 receives the light emitted by the light emitting diode 16 and conducts the light to its surfaces and emits the light from those surfaces.

The flexible light conductor 18 could be a printed circuit film light conductor. However, the flexible light conductor 18 is preferably made of silicon because silicon provides better mechanical properties. The exemplary flexible light conductor 18 is also formed in the shape of a rectangle. However, the flexible light conductor 18 could alternatively be formed in the shape of a square, triangle, or any other desired geometrical shape that would efficiently conduct light to one or more graphical elements to be illuminated with backlighting.

Figure 2:
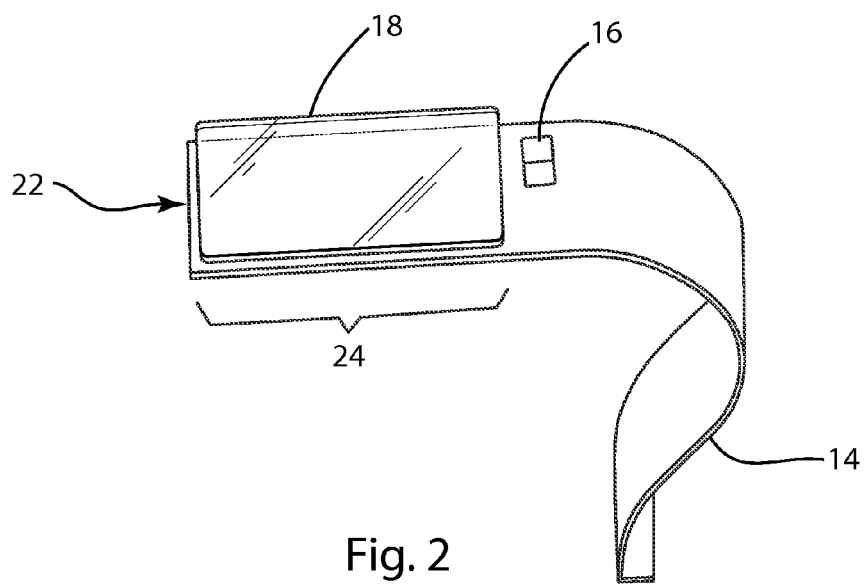
FIG. 2 is view of a portion of the exemplary embodiment of the flexible lighting system.

FIG. 2 is view of a portion of the flexible lighting system 10. The flexible light conductor 18 can be more clearly seen extending from the light emitting diode 16 to the end 22 of the flexible printed circuit board 14.

The flexible lighting system 10 is constructed to provide backlighting to one or more graphical elements formed in or on a display. These graphical elements can be telltales that indicate a state of a component or some type of an alarm state. For example, it is advantageous to incorporate the flexible lighting system 10 in a vehicle, such as an automobile, truck, bus, etc. In that case, a graphical element can be a telltale that indicates a state of a component in the vehicle or an alarm indicating a warning to the driver of a vehicle. Examples of such states that can be indicated in the vehicle include activation of a turn indicator light, activation of exterior lights, activation of high beams, transmission in drive, transmission in park, etc. Examples of alarms include high engine temperature, low oil level, low fuel level, malfunction indicator, etc. In an a vehicle, the display could be, for example, the dial 28 of a gauge 26 or the display could be a display screen 30 in a vehicle dashboard 32.

Figure 3:
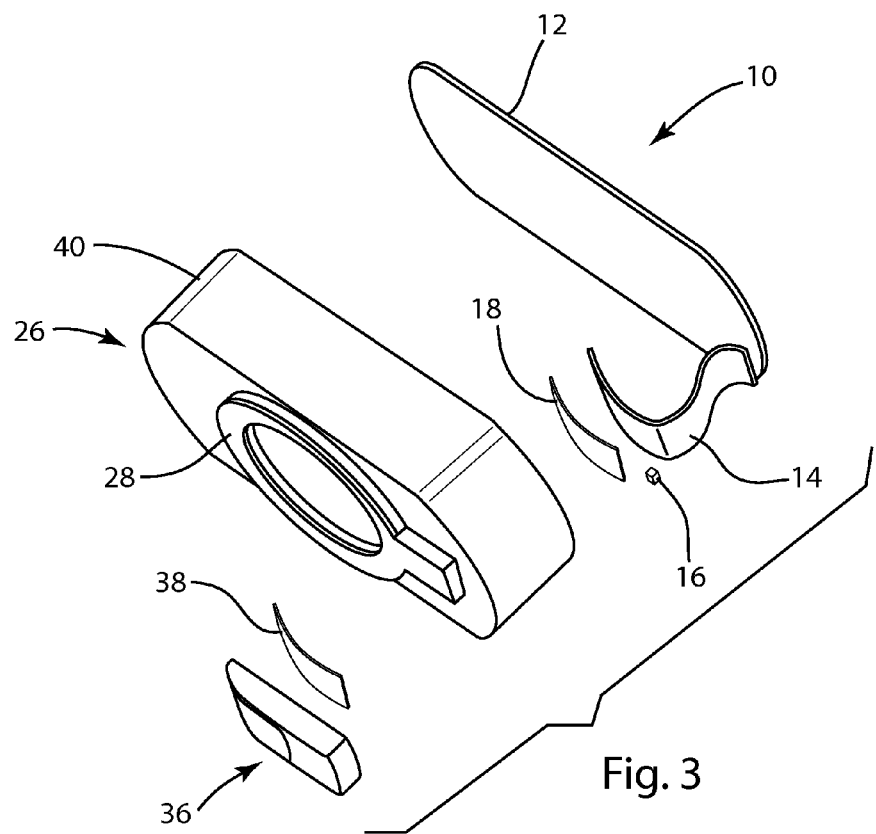
FIG. 3 is an exploded view of an exemplary embodiment of a gauge.
Figure 4:
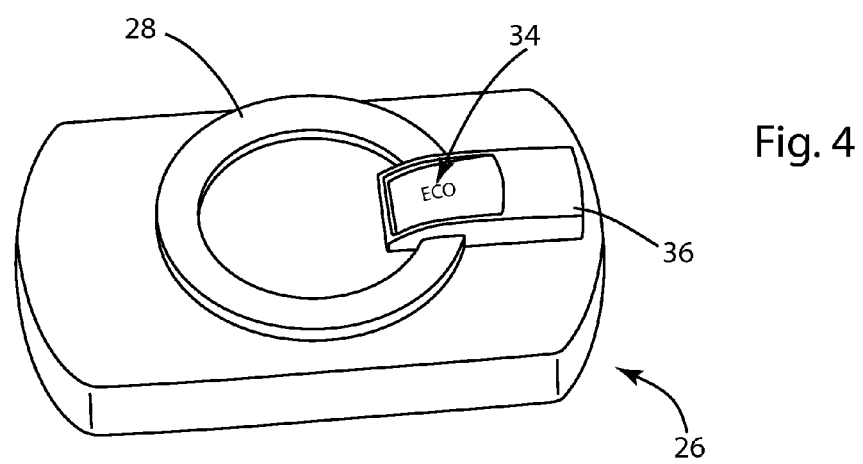
FIG. 4 is a front view of the exemplary embodiment of the gauge.

FIG. 3 is an exploded view of an exemplary embodiment of a gauge 26 that incorporates the flexible lighting system 10 to provide backlighting to a graphical element 34 (shown in FIG. 4) formed in a cover element 36 that will be located on the front of a display, namely, the dial 28. A colored film 38 may be provided. The printed circuit board 12 will be attached to rear of the housing 40 of the gauge 26. When assembled, the light emitting diode 16 will be located relatively close to the cover element 36 with the graphical element 34. Thus, the distance that the light travels in the flexible light conductor 18 is much smaller than if a light source were located on the printed circuit board 12 and light would have to travel through a light conductor from that location. FIG. 4 is a front view of the exemplary embodiment of the gauge 26 shown in an assembled state. The graphical element 34 in this example is the word "ECO" and the graphical element 34 is formed in the cover element 36 located on the front of the dial 28. Of course it is also possible to form a graphical element directly in the dial 28. The flexible light conductor 18 extends to a location near the graphical element 34. In this way, the flexible light conductor 18 conducts light from the light emitting diode 16 and emits the light from its surfaces to provide illumination or backlighting to the graphical element 34.

Figure 5:
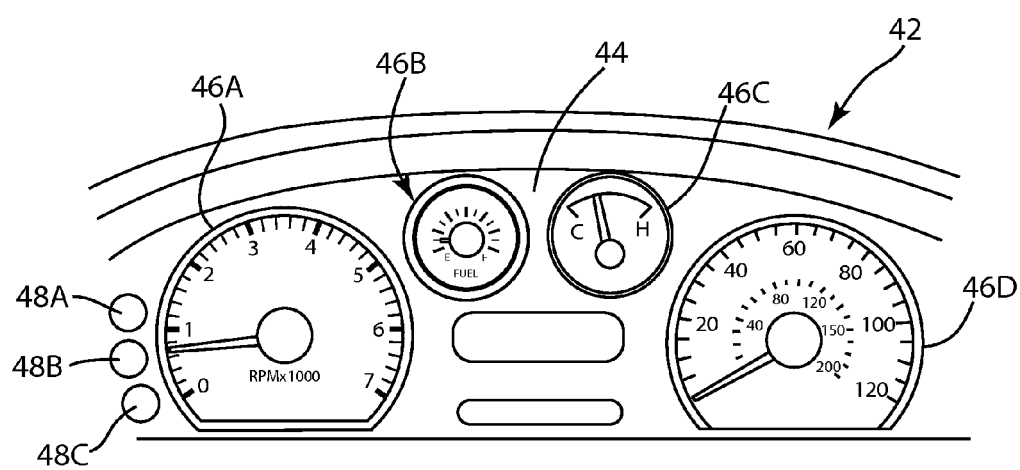
FIG. 5 is a front view of an instrument duster in a dashboard.

FIG. 5 is a front view of an instrument panel 44 in a vehicle dashboard 42. The instrument panel 44 serves as a display that includes multiple gauges 46A, 463, 460, and 46D. Any one or all of these gauges 46A, 46B, 46C, and 46D could include a flexible lighting system 10 to provide illumination or backlighting to one or more graphical elements formed in the respective gauge. The instrument panel 44 could also be formed with graphical elements 48A, 48B, and/or 48C. Each of the graphical elements 48A, 48B, and 48C could be illuminated or backlit by the flexible light conductor 18 of a respective flexible lighting system 10.

Alternatively, one flexible lighting system 10 could be used to provide illumination to multiple or all of the graphical elements 48A, 48B, and 48C. Depending on the circumstances, it might be possible for one flexible light conductor 18 of one flexible lighting system 10 to provide illumination for more than one of the graphical elements 48A, 48B, and 48C. Although not shown in the drawings, it is also possible to construct a flexible lighting system 10 with multiple flexible printed circuit boards extending from the printed circuit board 12. In this case, each flexible printed circuit board 14 would include a light emitting diode 16 and a flexible light conductor 18 that is routed near a respective graphical element 48A, 48B, 48C.

Now that the important features of the invention have been explained, it should be apparent to the person of ordinary skill in the art that numerous variants are possible. Thus, it should be understood that the invention is not limited to the specific examples discussed herein.

The invention claimed is:

1. A flexible lighting system, comprising:
a printed circuit board;
a flexible multiple electrical conductor strip;
a light source mounted on said flexible multiple electrical conductor strip and electrically connected to said printed circuit board by said flexible multiple electrical conductor strip; and
a flexible light conductor mounted on said flexible multiple electrical conductor strip to conduct and emit light from said light source, wherein said flexible multiple electrical conductor strip is a flexible printed circuit board.

2. A component, comprising:
a display with at least one graphical element formed therein; and
a flexible lighting system including: a printed circuit board, a flexible multiple electrical conductor strip, a light source mounted on said flexible multiple electrical conductor strip and electrically connected to said printed circuit board by said flexible multiple electrical conductor strip, and a flexible light conductor mounted on said flexible multiple electrical conductor strip and extending to said graphical element formed in said display of said component for conducting light from said light source and emitting the light to said graphical element formed in said display of said component, wherein said component is a gauge and said display is a dial of said gauge.

3. A component, comprising:
a display with at least one graphical element formed therein; and
a flexible lighting system including: a printed circuit board, a flexible multiple electrical conductor strip, a light source mounted on said flexible multiple electrical conductor strip and electrically connected to said printed circuit board by said flexible multiple electrical conductor strip, and a flexible light conductor mounted on said flexible multiple electrical conductor strip and extending to said graphical element formed in said display of said component for conducting light from said light source and emitting the light to said graphical element formed in said display of said component, wherein said display is in a vehicle dashboard.

* * * * *